Figure 1:
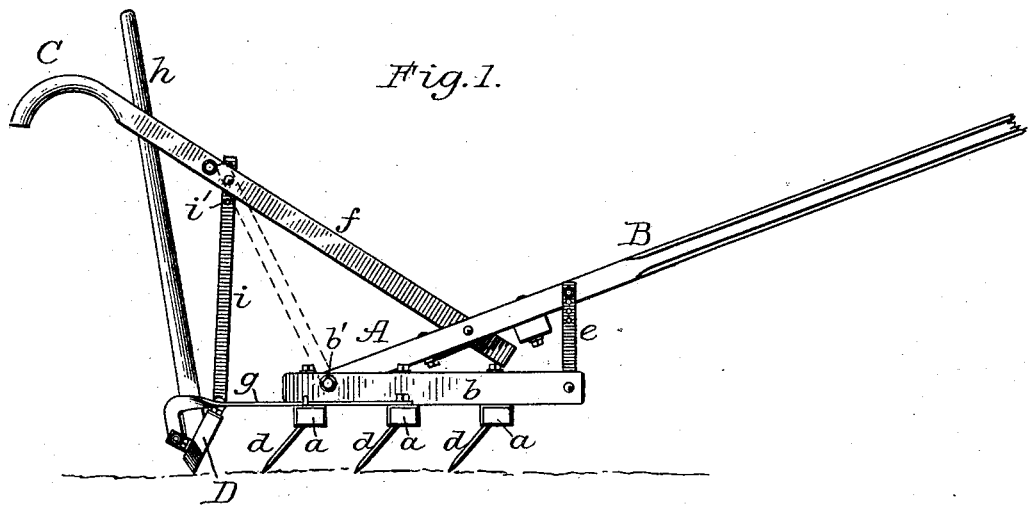

No. 712,907. Patented Nov. 4, 1902.
G. M. CLARK.
HARROW.
(Application filed May 17, 1898.)
(No Model.)

Attest:
W. F. Woolard
Wm. Somervell

Inventor:
George Marshall Clark,
By Howell Battle
Attorney

UNITED STATES PATENT OFFICE.

GEORGE MARSHALL CLARK, OF HIGGANUM, CONNECTICUT, ASSIGNOR, BY MESNE ASSIGNMENTS, TO CLEMENTINE I. CLARK, OF HIGGANUM, CONNECTICUT.

HARROW.

SPECIFICATION forming part of Letters Patent No. 712,907, dated November 4, 1902.

Application filed May 17, 1898. Serial No. 680,936. (No model.)

*To all whom it may concern:*

Be it known that I, GEORGE MARSHALL CLARK, a citizen of the United States, residing at Higganum, in the county of Middlesex and State of Connecticut, have invented new and useful Improvements in Harrows, of which the following is a specification.

The object of my invention is to secure in a harrow having the usual lump breaking and pulverizing capacities (common to various forms of toothed harrows, for instance) special capacities for good service as a leveler. To this end I have devised a machine which embodies a suitable frame, numerous suitable soil-working devices, such as several parallel rows of teeth crosswise of the line of draft, and a draft-pole (or its equivalent— viz., a pair of thills) rigidly coupled to the frame, so that when under working control by a team in motion the soil-working portion of the machine will be maintained in a substantially horizontal position fore and aft instead of tilting and following slight undulations of the surface of the ground, as is common to harrows to which the draft-couplings are flexibly connected. With a harrow embodying this portion of my invention the team will of course sometimes elevate and sometimes depress the outer end of the pole or thills, according to the character or extent of the undulations traveled over, and although the body of the harrow must respond somewhat to such variations there can be practically no tilting action in the line of draft, whereas with a pole or thills flexibly coupled to the body of the harrow (or with a chain, as is quite usual) the soil-working portion of the machine must and does not only tilt fore and aft, but also laterally in following small undulations of the surface. Having thus reduced the fore-and-aft-tilting action to a minimum, I have placed the lateral tilting action wholly under the control of the operator.

A suitable handle projecting rearwardly, attached to the frame, is grasped by a walking operator, so that whenever a hummock or lump is encountered at either side of the middle of the harrow he can prevent the other side of the harrow from tilting downwardly, and so cause the hummock to be specially worked off without displacing or unduly working the soil at either side. The handle also enables the operator, by a slight lift and a rearward pull against the moving team, to graduate the depth at which the teeth may work, or even lift them clear from the surface, thus making it possible to avoid excavating tendencies at depressed spots in the field and to specially operate upon such hummocks as are capable of being eliminated by the leveling action of a harrow while preparing a field for its seed.

The pole or thills when in service are rigidly coupled to the harrow-frame, and hence should be adapted for use with both low and tall teams. This adjustment is provided for by hinging the pole or thills to the frame and employing an intervening adjustable brace or braces, by which the pole or thills may be set at any desired height or inclination.

Having in view the leveling duty as a special function, the soil-working devices or teeth in my harrow are preferably inclined rearwardly; but this feature is not in itself new, and approximately desirable effects may be secured with vertical teeth or with various other well-known forms of soil-working devices.

For rendering the machine specially effective in working fields having unusually hummocky or broken wave-like surfaces I provide it with a scraper or leveler-bar, and although such devices have heretofore been organized with harrows of various kinds the leveler-bar in my machine is susceptible of novel control and operation. This leveler-bar is so carried by the frame of the harrow that it will normally substantially occupy and work in the same horizontal plane that the teeth or other soil-working devices move and work in instead of dropping into depressions or climbing humps, as is the usual operation of leveler-bars as heretofore employed in harrows. The handle of my machine so overlies my leveler-bar that an operator may stand with his whole weight upon the bar when specially heavy leveling work is to be done by the bar and also enables him to thus ride on the bar, but with the most of his weight upon the handle, whenever the soil-working devices have specially heavy breaking work to perform.

For enabling the leveler-bar to be either variably operated or rendered practically inoperative it is so hinged to its immediate supports that it may be rocked, and its lower or cutting edge thereby raised or lowered. A lever attached to and extending upwardly from the bar to and between the handles of the machine is accessible to the operator for controlling the bar while otherwise controlling the action of the machine.

To more particularly describe my invention, I will refer to the drawings, in which—

Figure 2:
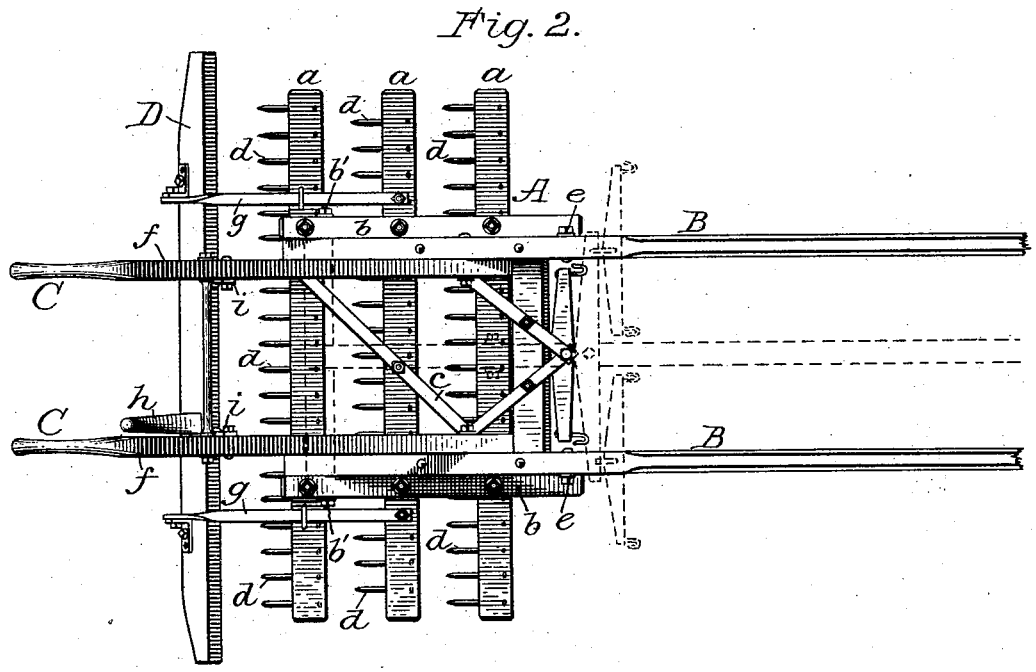

Figure 1 is a side elevation of one of my machines, and Fig. 2 is a plan or top view of the same.

It has already been indicated that my machines are to be worked either by single or by double teams, and hence they may be provided either with a pole or with thills, and although the latter only are specially shown in the drawings a pole is indicated in dotted lines in Fig. 2, and either is to be considered the equivalent of the other. It is also to be understood that without departure from my invention the frame of the machine may be widely varied in its construction, provided it affords ample retaining-seats for carrying an effective number of teeth or their equivalent numerous soil-working devices, and that the latter may be variably arranged, provided they are in lines or rows and are distributed over an ample area and occupy such positions laterally and longitudinally in the frame as to enable them to properly operate on the soil.

As here shown, the frame A is composed of three transverse tooth-bars $a\ a\ a$ of equal length and parallel with each other and two tie-bars $b\ b$, overlying the tooth-bars at right angles and bolted thereto. A diagonal brace-bar $c$ is secured to the tops of the tooth-bars, and this, with the two tie-bars, assures a rigid frame. The teeth $d$ are firmly seated in their bars at a rearward angle, (preferably forty-five degrees,) and they are so spaced in each bar and so set in each bar with relation to the teeth in the other two bars as to cause them to thoroughly work a strip of soil as wide as the machine. I do not restrict myself to any particular number of transverse bars nor to having them straight and parallel crosswise of the machine, provided the frame be rigidly coupled to the pole (or the thills, as the case may be) and also provided that the teeth or equivalent soil-working devices be numerous and be so arranged as to cover a sufficient area to operate effectively for the special purposes intended.

As here shown, the thills B are hinged between and to the two tie-bars $b$ at $b'\ b'$, and they are inclined upwardly and are firmly locked in position by vertical braces $e\ e$, which extend from the frame A to the thills and are bolted at top and bottom. This rigid coupling of the thills to the frame prevents the fore-and-aft-tilting action of the frame A independently of the draft connections, and in order that the harrow may bear flatly on the ground, whether a tall horse or a low one be harnessed in the thills, the braces $e$ at their upper ends are provided with several bolt-holes, thus enabling the outer ends of the thills to be raised or lowered, and thus adjusted according to the height of the team.

The harrow-handle C includes two upwardly-inclined counterpart bars or pieces $f\ f$, having appropriate downwardly-curved outer ends and secured to the harrow at their lower or inner ends, and they might be so secured to the frame by way of the longitudinal tie-bars, (as when a pole is used,) but preferably to the thills, (when they are used,) as shown, and between their lower points of connection and their adjusting-braces $e$, it being only important that said handle be so strongly and firmly connected that the harrow may thereby be tilted laterally or raised, and also so that the entire weight of the operator may be borne by the handle and carried by the harrow. It will be seen that with the machine thus organized and operated a substantial parallelism will be always maintained between the harrow and the general surface of the ground over which it may be moved regardless of slight undulations or hummocks, and these will therefore be thoroughly worked and leveled to a substantial degree.

The leveler-bar or scraper D is at the rear of the harrow, and it may be variably coupled therewith, provided it be so supported that it will normally have no capacity for free vertical movement independently of the harrow-frame. As here shown, the leveler-bar is supported at the outer ends of two flat metal rods $g\ g$, bolted to the tops of two of the tooth-bars, and although these rods may be capable of being sprung either upwardly or downwardly (because of their resiliency) they should be stiff enough without undue bending to normally maintain or support the leveler-bar, and especially if no other supporting devices be provided. At their outer ends the rods $g\ g$ are curved downwardly and forwardly and are hinged to the rear side of the leveler-bar, thus enabling the latter to rock as on a longitudinal axis. A vertical adjusting or controlling lever $h$ is secured to the leveler-bar and has its upper end adjacent to the handles accessible to the hand of the operator and enables him by rocking the leveler-bar to vary the extent of its action on the soil during the forward movement of the machine. As thus far described it will be seen that the leveler-bar will normally operate in the plane in which the harrow travels, but that it may be made to work deeper if the operator should apply the whole or a part of his weight upon the bar while steadying himself by the handles and that the working edge of said bar may be elevated above its normal plane and rendered practically inoperative by tilting it by means of its lever $h$, as when the soil-working devices have fully performed the leveling duty upon slight undulations. I deem it important, however, to employ pendent links i i between the handle and the leveler-bar, each link being hinged to the top of the bar and pivotally bolted to the handle, as indicated, each by way of one of several bolt-holes i', these latter enabling a vertical adjustment of the leveler-bar, if desired, and also enabling these links to serve as handle-braces, extending to and engaged by the bolts by which the thills are connected to the frame, as indicated in dotted lines in Fig. 1. When said links are connected to the leveler-bar and the weight of the operator is carried on said bar, the entire machine will be weighted; but with the links coupled to the frame his weight could be applied wholly to the leveler-bar or wholly to the main part of the machine, and while applied wholly to the machine the leveler-bar might be so rocked or turned as to engage with little or no soil. It will be observed that with the weight of the operator on the handle the front portion of the harrow cannot rise, because of its rigid connection with the pole or thills.

Having thus described my invention, I claim as new and desire to secure by Letters Patent—

1. The combination substantially as hereinbefore described, of a harrow-frame provided with numerous soil-working devices, a handle rearwardly extending therefrom, and a leveler-bar at the rear of said frame and below said handle, said leveler-bar being supported by said frame against free independent vertical movement.

2. The combination substantially as hereinbefore described, of a harrow-frame provided with numerous soil-working devices, thills rigidly secured to said frame, a handle rearwardly extending from said frame, and a leveler-bar at the rear of said frame and supported thereby against free independent vertical movement.

3. The combination substantially as hereinbefore described, of a harrow-frame provided with numerous soil-working devices, a handle rearwardly extending from said frame, a leveler-bar at the rear of said frame and below the handle, and one or more braces secured at one end to said handle and means for securing the other end to said leveler-bar or to said frame, for the purposes set forth.

4. The combination substantially as hereinbefore described, of a harrow having soil-working devices arranged in rows, rigidly-coupled thills, a rearwardly-projecting harrow-handle, a rocking leveler-bar below the handle at the rear of the harrow and provided with a vertical controlling-lever adjacent to the handle.

5. The combination with a harrow having a rearwardly-projecting handle, of a leveler-bar, beneath the handle at the rear of the harrow and coupled to its frame, and adjustable braces extending from the bar to and connected with the handle, substantially as described.

6. The combination with a harrow having a rearwardly-projecting handle, of a rocking leveler-bar beneath said handle and supported by said harrow against free independent vertical movement, and a controlling-lever for said leveler-bar adjacent to said handle, substantially as described.

In testimony whereof I have hereunto set my hand in presence of two subscribing witnesses.

GEORGE MARSHALL CLARK.

Witnesses:
 JOHN C. CONLEY,
 CLEMENT S. HUBBARD.